United States Patent

[11] 3,559,524

[72] Inventor: Hendrik Glastra, Enschede, Netherlands
[21] Appl. No.: 820,505
[22] Filed: Apr. 30, 1969
[45] Patented: Feb. 2, 1971
[73] Assignee: N. V. Maatschappij voor Industriele Research en Ontwikkeling, Enschede, Netherlands
[32] Priority: May 10, 1968
[33] Netherlands
[31] 6806654

[54] DEVICE FOR CUTTING LAMINATED MATERIAL
4 Claims, 5 Drawing Figs.

[52] U.S. Cl. .................................. 83/648, 83/925; 269/296, 269/309
[51] Int. Cl. .................................. B26d 7/00
[50] Field of Search ......................... 83/648, 925c.c.; 269/296, 302, 309, 311

[56] References Cited
UNITED STATES PATENTS

| | | | |
|---|---|---|---|
| 3,262,348 | 7/1966 | Wiatt et al. | 83/648UX |
| 3,347,121 | 10/1967 | Wiatt | 83/648UX |
| 3,451,300 | 6/1969 | Messinger | 83/648 |

Primary Examiner—James M. Meister
Attorney—Woodhams, Blanchard and Flynn

ABSTRACT: A device for cutting plate material, comprising a supporting face for the material constituted by a flexible belt guided about rollers which are supported by a carriage movable along a frame, together with a transverse slit, and the cutter, the flexible belt being supported by an articulated supporting table, which is constructed from a plurality of juxtaposed oblong plates the long sides of which are hingedly interconnected, while their ends bear on supporting members provided on the two longitudinal edges of the frame and movable into and out of the plane of the articulated supporting table, under the action of cams provided on the carriage.

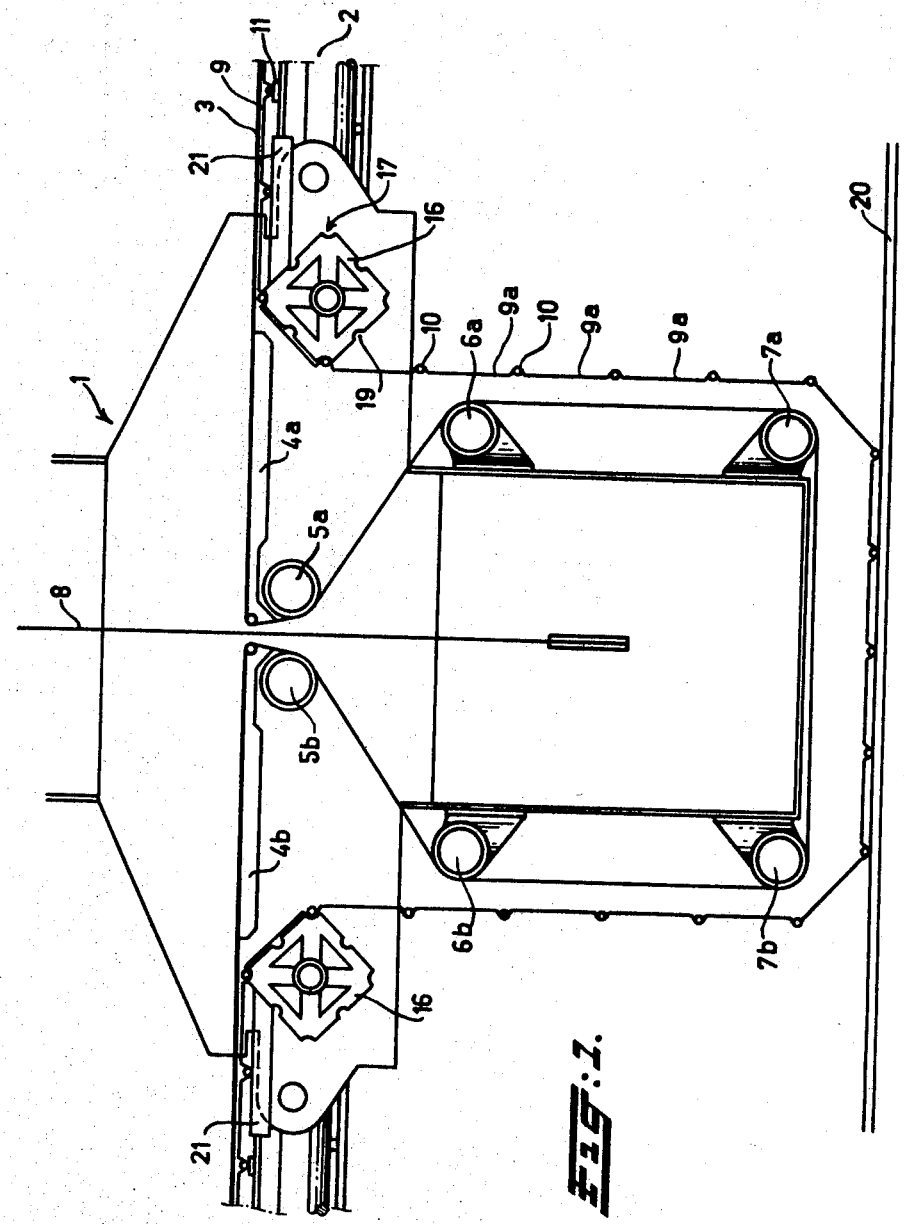

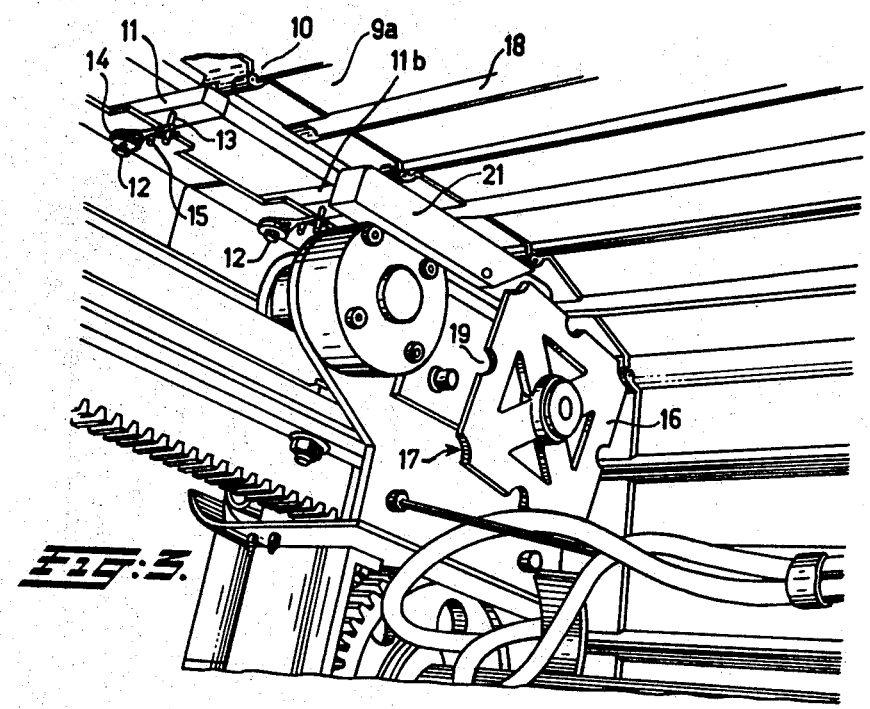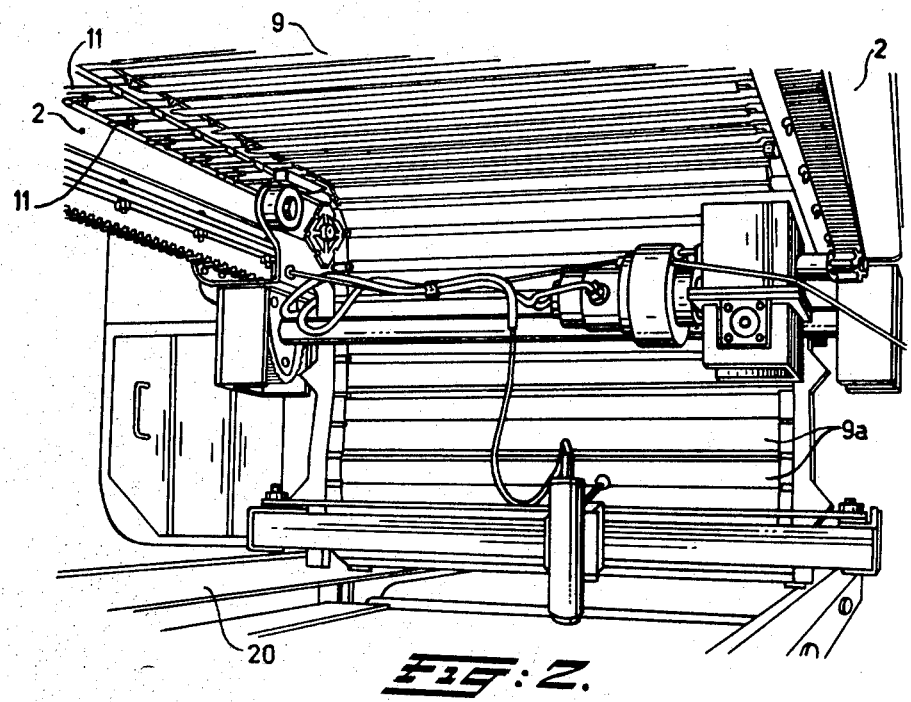

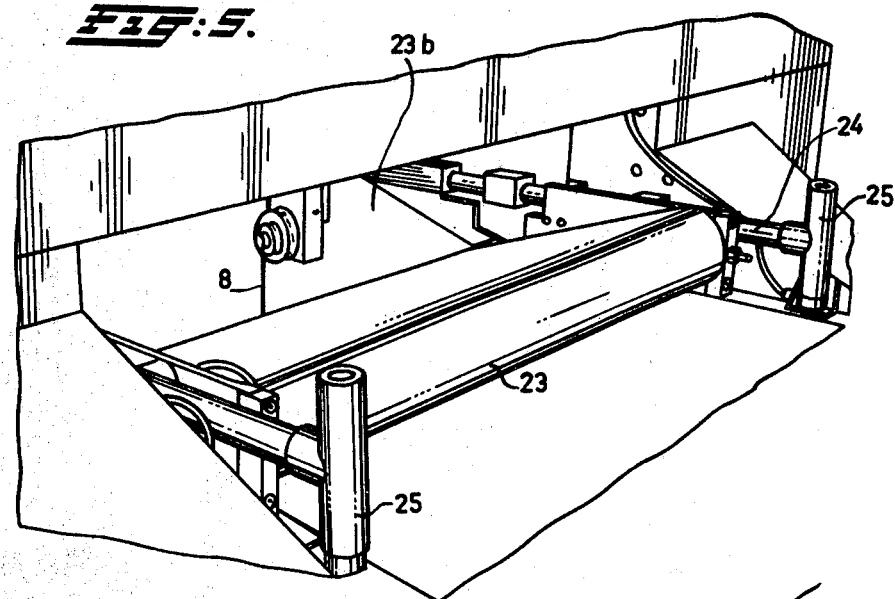
FIG: 5.
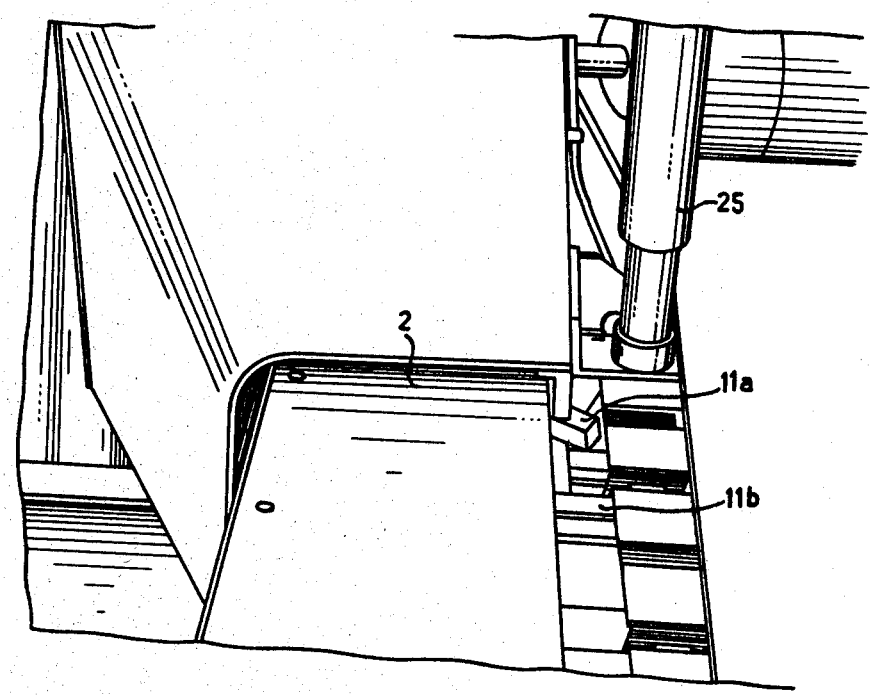
FIG: 4.

DEVICE FOR CUTTING LAMINATED MATERIAL

My invention related to a device for cutting plate material comprising a supporting face for the material to be cut, that is constituted by a flexible belt which is guided about two guide rollers which are mounted on either side of, and at a short distance from, the cutter, and also guided about at least on other guide roller placed thereunder, the said rollers being supported by a carriage which also carries the oblong cutter and which is movable in a longitudinal direction along a frame, the arrangement being such that the transverse slit determined by the edges of the belt, and in which the cutter lies, moves with the movement of the carriage along the flexible belt, while the portion of the flexible belt which supports the material is supported by an articulated supporting table, disposed thereunder, the ends of which are fixedly secured to the two ends of the frame and which supporting table is constructed from a plurality of juxtaposed oblong supporting elements, coupled to each other, the ends of which are supported by the two longitudinal edges of the frame, while the carriage is provided with cams by means of which, when the carriage moves in the longitudinal direction of the belt, the support of the supporting elements before the carriage is eliminated, the said articulated supporting table being guided on guide members provided on either side of the guide rollers and rotatably supported by the table, the axis of rotation of the guide members being parallel to the axis of the guide rollers in such a way that the portion of the flexible belt passing over the guide rollers is enclosed by a portion of the articulated supporting table.

Such a device is known in itself from the French Pat. 1.479.158. In this known device the supporting members are made up by mutually parallel, spaced, rods which are interconnected by means of flexible cables, and which rods comprise pins which are guided in the ends thereof and can slide in the longitudinal direction of the rods, while the ends of the pins rest in the free space of the channel section of the longitudinal beams of the frame. The cams provided on the carriage cooperate with abutments connected to the movable pins, the abutments pressing the pins successively inwards when the carriage approaches so that the rods, one by one, clear their support and, hanging on the connecting cables, move out of the plane of the articulated supporting table.

This known device has a number of disadvantages. The material to be cut is not supported on its entire surface but only along a number of lines so that the support is not very good. The construction is furthermore rather complicated and as a consequence not cheap; high surface pressures, which cause a fast wear of the supporting mechanism, are set up when the table is loaded.

It is an object of my invention to obviate these disadvantages and to provide a device of the known kind which is constructed in a simpler way and provides a better support of the material to be cut. My invention therefore provides a device in which the supporting elements consist of oblong plates the long sides of which are hingedly interconnected, while the ends of these plates bear on supporting members provided on the two longitudinal edges of the frame and movable into and out of the plane of the articulated supporting table, the said supporting members being capable of being moved out of the plane of the articulated supporting table by cams provided on the carriage.

Since the supporting elements are plate-shaped and directly adjoin each other a support of the material to be cut is obtained which is almost equal to the kind of support as provided by a flat continuous table; moreover this construction of the articulated supporting table makes it possible that the supporting members for the elements of the table are secured to the frame itself, so that they can have dimensions which assure the desired high rigidity. The invention therefore not only results in a simple construction, but moreover gives a better support and a greater reliability.

The supporting members consist preferably of supporting fingers, secured to the longitudinal beams of the frame and rotatable around a vertical axis, which are kept under spring tension in a position perpendicular to the longitudinal beams, while the carriage in the vicinity of each cam and before the guide member carries a supporting slide in order to support the articulated table, the supporting surface of the slide being at a higher level than the upper surface of the supporting fingers.

A proper support of the flexible belt throughout its length, therefore also on the portion situated between the guide members for the articulated supporting table and the guide rollers for the flexible belt, is ensured when the carriage carries between the guide members for the articulated supporting table and the guide rollers for the flexible belt a supporting plate which supports the flexible belt.

In some cases it may be desired that the material to be cut is not only supported in the direct surroundings of the cutter, but is also pressed from above on this support over a certain surface. Preferably a pressure belt is in fact provided on either side of the cutting slit which bears with an adjustable pressure on the material and which is guided about two rollers one of which is synchronized with the motion of the carriage.

A more complete understanding of my invention, and of further objects and features thereof can be obtained from the following description of illustrative embodiments thereof, when considered in connection with the accompanying drawings, wherein:

FIG. 1 represents diagrammatically a cross section of a part of the device according to the invention;

FIG. 2 is a perspective view of a portion of the articulated supporting table with the associated supporting members;

FIG. 3 is on an enlarged scale, a perspective view of the guide mechanism of the articulated supporting table;

FIG. 4 is a perspective view of a portion of the articulated supporting table and the supporting fingers;

FIG. 5 is a perspective view of one of the pressure belts provided above the flexible belt.

FIG. 1 shows the carriage 1, which can move along the diagrammatically represented longitudinal beams 2 of the frame of the cutting machine and the flexible belt 3, which runs in the carriage 1 over two guide plates 4a, 4b, the guide rollers 5a, 5b, 6a, 6b and the sprockets 7a, 7b. In the slit determined between the edges of the flexible belt in the carriage lies a suitably guided, diagrammatically represented, cutting wire 8 which is movable in a transverse direction.

When the carriage 1 moves in the longitudinal direction of the frame 2 the width of the cutting slit remains unchanged and the material situated on the belt 3 is cut through in the longitudinal direction. When the cutting wire 8 moves in a transverse direction the material is cut through in a transverse direction; obviously any combination of the longitudinal and transverse movement is possible.

It is desired that the flexible belt 3 on the entire length of the upper portion thereof is supported in the best possible way. According to my invention an articulated supporting table 9 is provided under this upper portion, said table consisting of plates 9a which by their longitudinal edges are hingedly interconnected at 10. These hinges bear on supporting fingers 11 which, rotatable about a vertical shaft 12, are provided on the two longitudinal beams of the frame. In this way a surface resistant to vertical pressures is obtained. Each supporting finger carries a pin 13 which is gripped by the two legs of a hairpin spring 14 which also grips around a pin 15 which is stationary with respect to the supporting finger 11. As a consequence each supporting finger can be moved from its central position in opposition to the action of the hairpin spring, but returns, when it can move freely, to its central position under the hinge 10. The carriage 1 carries by means of suitable bearings, four guide plates 16, of square shape and with cutout corners 17, on which the articulated supporting table 9 is guided. As in the shown embodiment the plates 9a are provided with a downwardly pressed-out profile 18 the sides of the guide plates 16 are provided with corresponding recesses 19. The guide plates can freely rotate; the axes of rotation extend parallel to those of the guide rollers 5 to 7.

As FIG 1 shows the articulated supporting table 9 extends vertically downwards from the guide plates 16 and comprises the portion of the flexible belt 3 which is guided about the guide rollers 6 and 7 Two supporting beams extending throughout the frame support the horizontally extending portion of the articulated supporting table 9.

When the carriage 1 moves along the frame beams 2 the surface, made up by the plates 8a which are supported by their hinges, must be reduced in front of the carriage and be reformed behind the carriage. The supporting fingers 11 must therefore in front of the carriage be turned out of the plane of the articulated supporting table 9 and behind the carriage return to this plane.

The carriage is therefore in the vicinity of each supporting plate 16 provided with a supporting slide 21 extending in the longitudinal direction, the upper surface of which, as FIG. 1 shows, being at a higher level than the upper surface of the supporting fingers 11. When the carriage moves to the right, the right-hand supporting slides slide always underneath the hinges 10 of a plate 9a and lift same, whereby the underface thereof clears the supporting finger. The support of the articulated supporting table is now effected by the supporting slides 21 and the freed supporting finger can now, during further movement of the carriage, be pushed aside. FIG. 4 shows a situation in which the supporting finger 11a is pushed out of the way, whereas the supporting finger 11b is still in its central position; FIG. 3 shows how the supporting slide 21 has taken over the support of the plates bearing thereon.

It is evident that the support and guiding of a particular plate, which is initially supported by the supporting slides 21, during the further movement of the carriage, is taken over by the guide plates 16. The latter turn on movement of the carriage in a longitudinal direction on their respective shafts.

At the rear end of the carriage, as seen in the direction of movement thereof, the plates after having been guided on the guide plates 16 provided at this end again bear with the underface of their hinges on the supporting slide 21 provided there, the supporting fingers, moved away from their central position, return, one by one, to the central position and take over the support of the plates.

In this way the supporting belt which on either side of the carriage constitutes a rigid supporting face is, so to speak, broken up part by part and built up part by part again behind the carriage. Independently thereof the flexible belt 3 can be shifted in the longitudinal direction on its guide rollers in order to supply the material.

As FIG. 5 shows a pressure belt 23a, 23b can be provided above the flexible belt on either side of the cutting wire 8. These pressure belts 23a, 23b are guided by suitably guide rollers (not shown) supported in a frame 24 which is supported by hydraulic jacks 25. In dependence of the pressure of the medium in these jacks the pressure belts press with a certain pressure on the material thereunder. The guide rollers are synchronously driven with the movement of the carriage, so that the material situated thereunder cannot slide during the cutting operation.

Having thus described my invention, what is claimed as new and described to be secured by Letters Patent is:

I claim.

1. A device for cutting plate material, comprising a supporting face for the material to be cut that is constituted by a flexible belt which is guided about two guide rollers which are mounted on either side of, and at a short distance from, a cutter, and also about at least one other guide roller placed thereunder, the said rollers being supported by a carriage which also carries the cutter and which is movable in a longitudinal direction along a frame, the arrangement being such that the transverse slit, determined by the edges of the belt and in which the cutter lies, moves with the movement of the carriage along the flexible belt, while the portion of the flexible belt which supports the material is supported by an articulated supporting table, disposed thereunder, the ends of which are fixedly secured to the two ends of the frame and which supporting table is constructed from a plurality of juxtaposed oblong supporting elements, coupled to each other, the ends of which are supported by the two longitudinal edges of the frame, while the carriage is provided with cams by means of which, when the carriage moves in the longitudinal direction of the belt, the support of the supporting elements before the carriage is eliminated, the said articulated supporting table being guided on guide members provided on either side of the guide rollers and rotatably supported by the table, the axis of rotation of the guide members being parallel to the axis of the guide rollers in such a way that the portion of the flexible belt passing over the guide rollers is enclosed by a portion of the articulated supporting table, characterized in that the supporting element comprises oblong plate the long sides of which are supporting interconnected, while the ends of these plates bear on supporting members provided on the two longitudinal edges of the frame and movable into and out of the plane of the articulated supporting table, said supporting members being capable of being moved out of the plane of the articulated supporting table by cams provided on the carriage.

2. A device according to claim 1, characterized in that the supporting members comprises supporting fingers rotatable about a vertical axis and secured to the longitudinal beams of the frame, which fingers are kept under spring tension in a position essentially perpendicular to the longitudinal beams, while the carriage carries, in the vicinity of each cam and before the guide member, a supporting slide serving to support the articulated supporting table, the supporting surface of the slide being at a higher level than the upper surface of the supporting fingers.

3. A device according to claim 1, characterized in that the carriage carries, between the guide members for the articulated supporting table and the guide rollers for the flexible belt, a supporting plate which supports the flexible belt.

4. A device according to claim 1, characterized in that a pressure belt is provided on either side of the cutting slit which is bearing with an adjustable pressure on the material and which is guided about two rollers, one of which is driven synchronously with the motion of the carriage.